United States Patent
Yang et al.

(10) Patent No.: US 11,514,827 B1
(45) Date of Patent: Nov. 29, 2022

(54) VEHICULAR ADVERTISEMENT PLAYING DEVICE

(71) Applicant: LITEMAX ELECTRONICS INC., New Taipei (TW)

(72) Inventors: Tien-Teng Yang, New Taipei (TW); Chun-Hung Chen, New Taipei (TW)

(73) Assignee: LITEMAX ELECTRONICS INC., New Taipei (TW)

( * ) Notice: Subject to any disclaimer, the term of this patent is extended or adjusted under 35 U.S.C. 154(b) by 0 days.

(21) Appl. No.: 17/467,291

(22) Filed: Sep. 6, 2021

(51) Int. Cl.
G09F 21/04 (2006.01)
G06F 3/14 (2006.01)
G09F 9/30 (2006.01)
B60Q 9/00 (2006.01)
G06Q 30/02 (2012.01)

(52) U.S. Cl.
CPC ............ G09F 21/042 (2020.05); B60Q 9/00 (2013.01); G06F 3/1423 (2013.01); G09F 9/30 (2013.01); G06Q 30/0265 (2013.01)

(58) Field of Classification Search
CPC .......... G09F 21/042; G09F 9/30; G09F 13/04; G09F 13/0413; B60Q 9/00; B60Q 1/503; B60Q 1/2611; B60Q 1/5035; B60Q 1/5037; B60Q 1/549; G06F 3/1423; G06Q 30/0265; Y10S 362/812; B60R 13/00
See application file for complete search history.

(56) References Cited

U.S. PATENT DOCUMENTS

| | | | | |
|---|---|---|---|---|
| 7,449,998 | B1 * | 11/2008 | Au | B60Q 1/50 455/99 |
| 10,299,415 | B1 * | 5/2019 | Yang | H05K 5/0217 |
| 2002/0112026 | A1 * | 8/2002 | Fridman | G09F 21/04 455/99 |
| 2015/0381922 | A1 * | 12/2015 | Hamilton | H04N 5/655 348/837 |
| 2018/0272959 | A1 * | 9/2018 | Hornsby | G09F 21/04 |
| 2018/0315356 | A1 * | 11/2018 | Dunn | H05K 7/20954 |
| 2020/0377032 | A1 * | 12/2020 | Alex | G06F 3/1423 |

FOREIGN PATENT DOCUMENTS

TW M619290 * 11/2021

* cited by examiner

*Primary Examiner* — Cassandra Davis

(57) ABSTRACT

A vehicular advertisement playing device includes a frame, first display unit, second display unit, first gas guide unit, second gas guide unit, casing, link unit and playing control unit. The frame is mounted on a vehicle. The playing control unit and link unit send advertisement playing data to the first display unit and second display unit for playing. The playing control unit drives the first gas guide unit and second gas guide unit to carry out heat dissipation. Therefore, the vehicle plays advertisements ubiquitously, instantly, and thus efficiently.

10 Claims, 5 Drawing Sheets

VEHICULAR ADVERTISEMENT PLAYING DEVICE

BACKGROUND OF THE INVENTION

1. Field of the Invention

The present disclosure relates to vehicular advertisement playing devices, and in particular to a vehicular advertisement playing device which enables a vehicle to play advertisements ubiquitously, instantly, and thus efficiently.

2. Description of the Related Art

Conventionally, advertisements placed on vehicles are mostly stationary, for example, in the form of paper. However, the paper-based advertisements take time to place on vehicles and remove from the vehicles, bring inconvenience to advertisers.

BRIEF SUMMARY OF THE INVENTION

An objective of the present disclosure is to provide a vehicular advertisement playing device whereby a vehicle plays advertisements ubiquitously, instantly, and thus efficiently.

To achieve at least the above objective, the present disclosure provides a vehicular advertisement playing device, comprising a frame, a first display unit, a second display unit, a first gas guide unit, a second gas guide unit, a casing, a link unit and a playing control unit. The frame is mounted on a vehicle. The first display unit is disposed on one side of the frame. The second display unit is disposed on the other side of the frame. The first gas guide unit is disposed at one end of the frame. The second gas guide unit is disposed at the other end of the frame. One side of the casing has a first window portion. The other side of the casing has a second window portion. One end of the casing has a first through hole portion. The other end of the casing has a second through hole portion. The casing is coupled to the frame. The first window portion corresponds in position to the first display unit. The second window portion corresponds in position to the second display unit. The first through hole portion corresponds in position to the first gas guide unit. The second through hole portion corresponds in position to the second gas guide unit. The link unit is disposed at the top of the casing. The playing control unit is connected to the first display unit, the second display unit, the first gas guide unit, the second gas guide unit and the link unit.

Regarding the vehicular advertisement playing device, at least two coupling portions are disposed at the bottom of the frame. The coupling portions are coupled to the vehicle. The bottom of the frame has a plurality of through holes.

Regarding the vehicular advertisement playing device, at least two securing portions are disposed at the top of the frame and coupled to the casing.

Regarding the vehicular advertisement playing device, the first display unit and the second display unit are multimedia displays, screens or touchscreens.

Regarding the vehicular advertisement playing device, the first gas guide unit comprises a first fan, a second fan and a first filtering module. The first fan lies above the second fan. The first filtering module at least corresponds in position to the second fan.

Regarding the vehicular advertisement playing device, the second gas guide unit comprises a third fan, a fourth fan and a second filtering module. The third fan lies above the fourth fan. The second filtering module at least corresponds in position to the fourth fan.

Regarding the vehicular advertisement playing device, the casing further comprises a first light-penetrable board and a second light-penetrable board. The first light-penetrable board is disposed at the first window portion and hermetically seals the first display unit. The second light-penetrable board is disposed at the second window portion and hermetically seals the second display unit.

Regarding the vehicular advertisement playing device, the link unit is a GPS communication interface, 4G communication interface, 5G communication interface or Wi-Fi communication interface.

Regarding the vehicular advertisement playing device, the playing control unit is disposed on the inner side of the casing.

Regarding the vehicular advertisement playing device, the playing control unit is disposed on the outer side of the casing and has a connector and a transmission line. The first display unit, the second display unit, the first gas guide unit, the second gas guide unit and the link unit are connected to the connector. The playing control unit is connected to the connector by the transmission line.

The vehicular advertisement playing device further comprises a first photosensor and a second photosensor. The first photosensor is connected to the first display unit. The second photosensor is connected to the second display unit.

Therefore, according to the present disclosure, the vehicular advertisement playing device is characterized in that the frame is mounted on the vehicle. The playing control unit and link unit enable the advertisement playing data to be sent to the first display unit and second display unit for playing. The playing control unit drives the first gas guide unit and second gas guide unit to carry out heat dissipation. Therefore, the vehicle plays advertisements ubiquitously, instantly, and thus efficiently.

DETAILED DESCRIPTION OF THE INVENTION

To facilitate understanding of the object, characteristics and effects of this present disclosure, embodiments together with the attached drawings for the detailed description of the present disclosure are provided.

Figure 1:
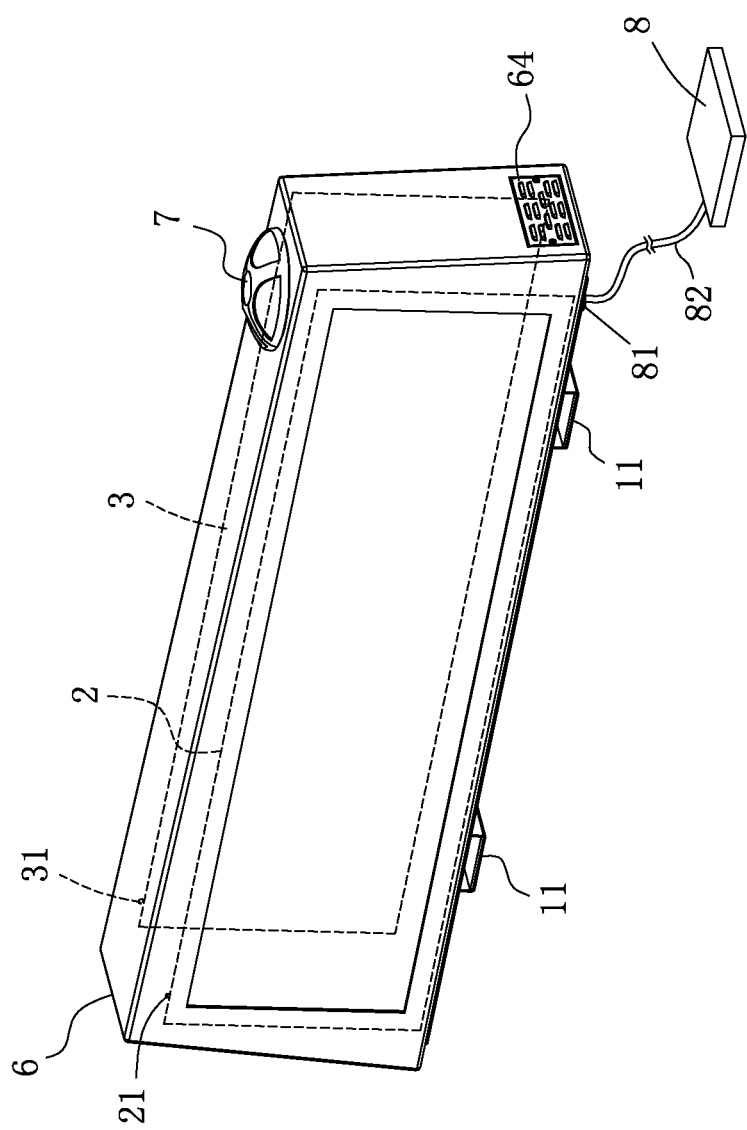
FIG. 1 is a perspective view of a vehicular advertisement playing device of the present disclosure.
Figure 2:
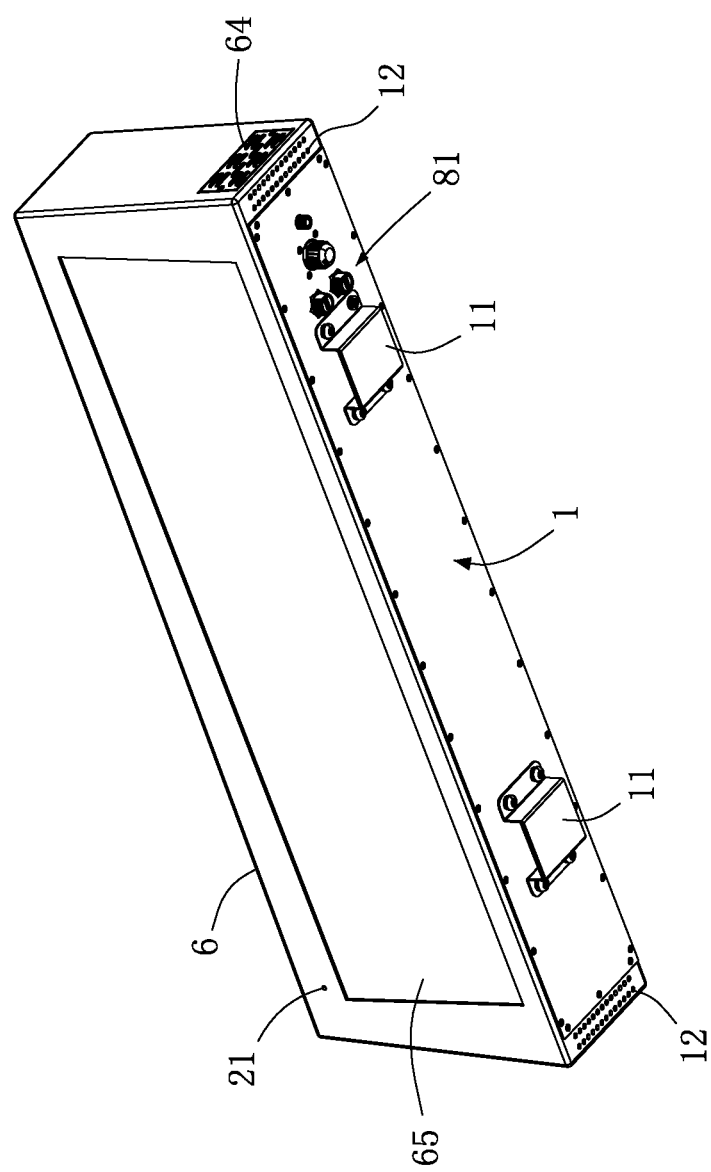
FIG. 2 is another perspective view of the vehicular advertisement playing device of the present disclosure.
Figure 3:
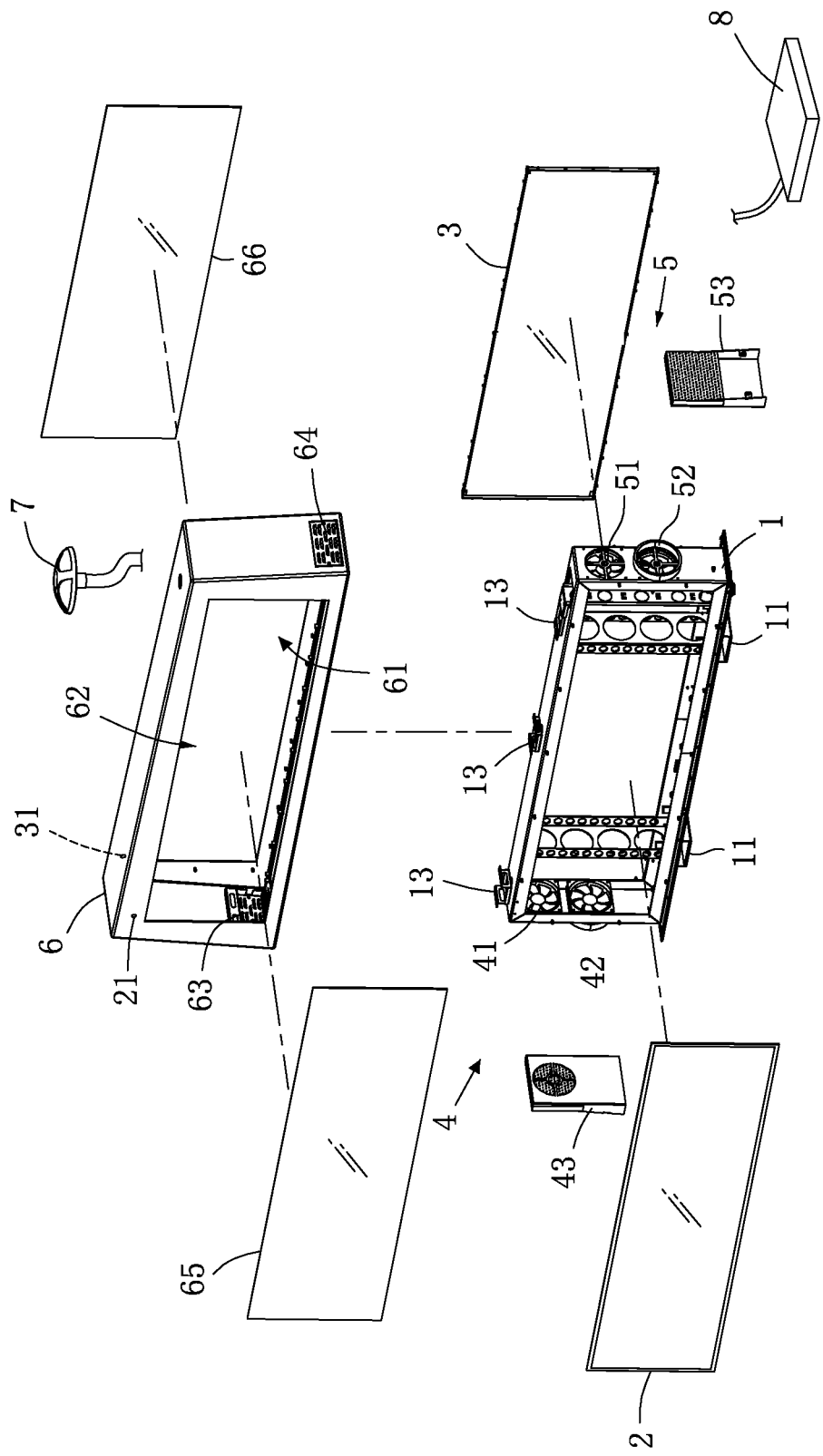
FIG. 3 is an exploded view of the vehicular advertisement playing device of the present disclosure.
Figure 4:
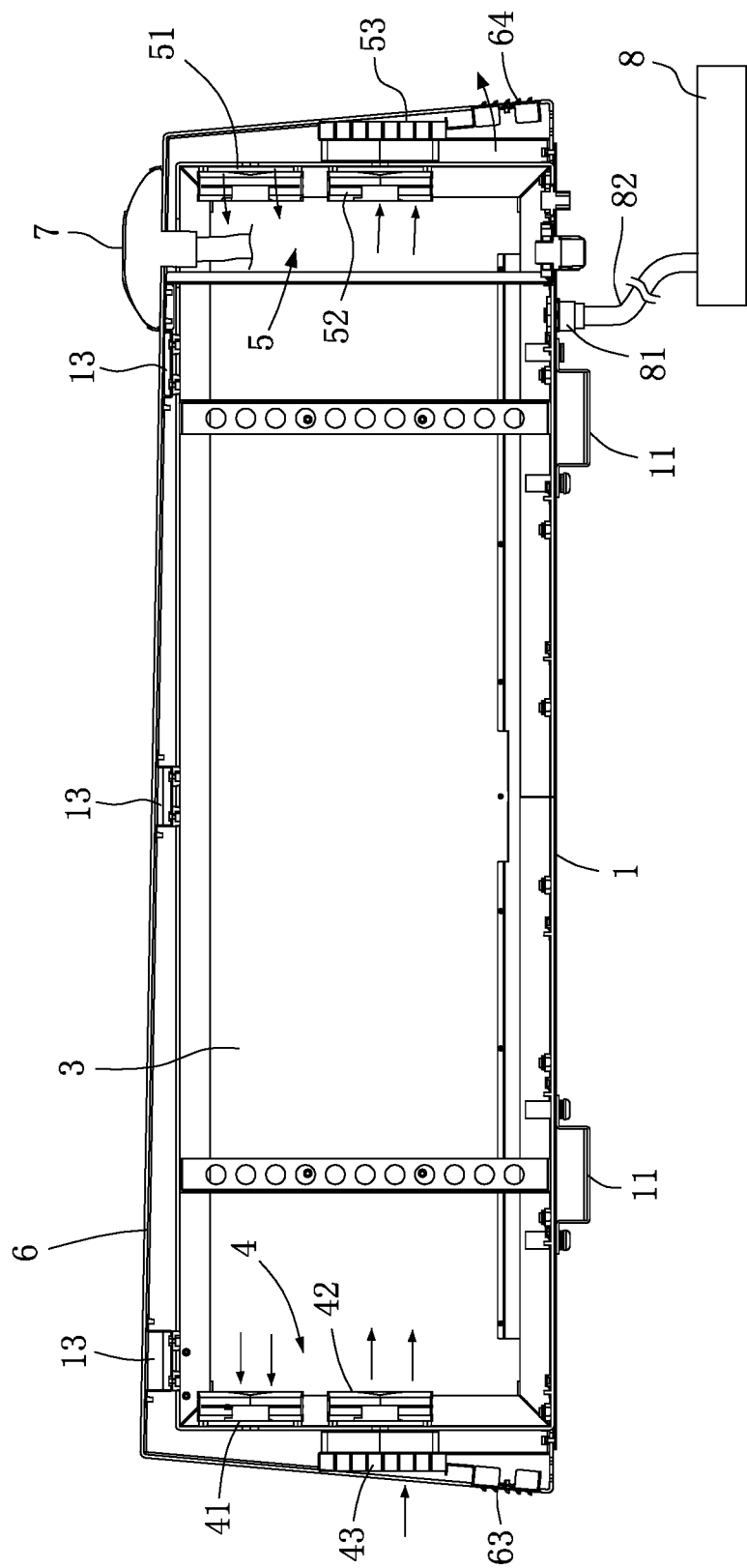
FIG. 4 is a cross-sectional view of the vehicular advertisement playing device of the present disclosure.
Figure 5:
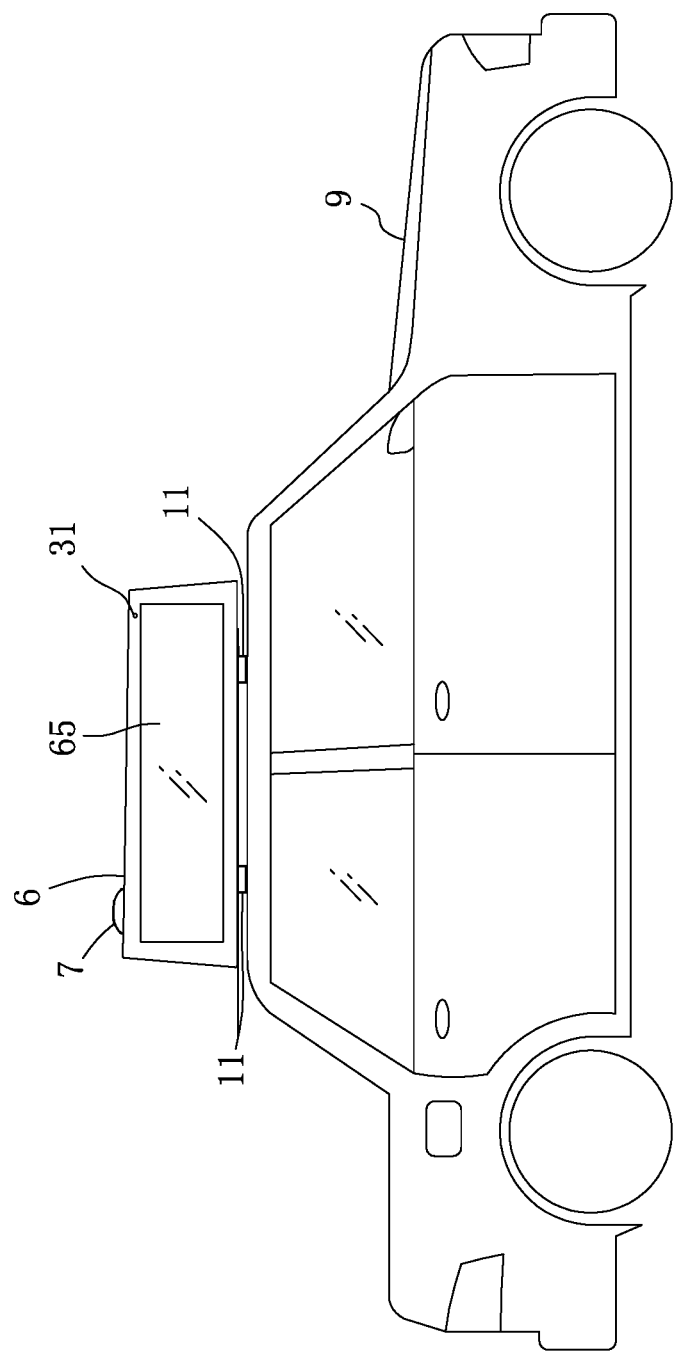
FIG. 5 is a schematic view of how to use the vehicular advertisement playing device of the present disclosure.

Referring to FIG. 1 through FIG. 5, the present disclosure provides a vehicular advertisement playing device which comprises a frame 1, a first display unit 2, a second display unit 3, a first gas guide unit 4, a second gas guide unit 5, a casing 6, a link unit 7 and a playing control unit 8.

The frame 1 is mounted on a vehicle 9.

The first display unit 2 is disposed on one side of the frame 1.

The second display unit 3 is disposed on the other side of the frame 1.

The first gas guide unit 4 is disposed at one end of the frame 1.

The second gas guide unit 5 is disposed at the other end of the frame 1.

One side of the casing 6 has a first window portion 61. The other side of the casing 6 has a second window portion 62. One end of the casing 6 has a first through hole portion 63. The other end of the casing 6 has a second through hole portion 64. The casing 6 is coupled to the frame 1. The first window portion 61 corresponds in position to the first display unit 2. The second window portion 62 corresponds in position to the second display unit 3. The first through hole portion 63 corresponds in position to the first gas guide unit 4. The second through hole portion 64 corresponds in position to the second gas guide unit 5.

The link unit 7 is disposed at the top of the casing 6.

The playing control unit 8 is connected to the first display unit 2, the second display unit 3, the first gas guide unit 4, the second gas guide unit 5 and the link unit 7.

To start using the vehicular advertisement playing device of the present disclosure, the frame 1 is mounted on the top of the vehicle 9, and the playing control unit 8 is connected to a power source (not shown) of the vehicle 9, such that the playing control unit 8 supplies electric power to the first display unit 2, the second display unit 3, the first gas guide unit 4, the second gas guide unit 5 and the link unit 7.

In order for the vehicular advertisement playing device of the present disclosure to operate, the link unit 7 receives remote advertisement playing data and sends the advertisement playing data to the playing control unit 8. The playing control unit 8 decodes and encodes the advertisement playing data and then sends the advertisement playing data to the first display unit 2 and the second display unit 3 for playing. Meanwhile, the playing control unit 8 drives the first gas guide unit 4 and the second gas guide unit 5. Therefore, the first gas guide unit 4 and the first through hole portion 63 together enable gas guidance to take place inside and outside the casing 6, whereas the second gas guide unit 5 and the second through hole portion 64 together enable gas guidance to take place inside and outside the casing 6. The gas guidance enabled by the first gas guide unit 4 and the second gas guide unit 5 facilitates heat dissipation of the first display unit 2 and the second display unit 3. Therefore, the playing control unit 8 and the link unit 7 enable advertisement playing data to be sent to the first display unit 2 and the second display unit 3 for playing, whereas the playing control unit 8 drives the first gas guide unit 4 and the second gas guide unit 5 to carry out heat dissipation. Therefore, the vehicle 9 plays advertisements ubiquitously, instantly, and thus efficiently.

In an embodiment of the present disclosure, at least two coupling portions 11 are disposed at the bottom of the frame 1 and coupled to the top of the vehicle 9. The bottom of the frame 1 has a plurality of through holes. 12. Therefore, owing to the coupling portions 11, the frame 1 is firmly coupled to the top of the vehicle 9. The through holes 12 function as drainage holes or ventilation holes; thus, with the casing 6 being coupled to the frame 1, the inside of the casing 6 stays ventilated and dry, so as to effectively meet the usage needs in outdoor environments.

In an embodiment of the present disclosure, at least two securing portions 13 are disposed at the top of the frame 1 and coupled to the casing 6. Therefore, the frame 1 and the casing 6 are coupled together firmly.

In an embodiment of the present disclosure, the first display unit 2 and the second display unit 3 are multimedia displays, screens or touchscreens. Therefore, multimedia displays, screens or touchscreens function as the first display unit 2 and the second display unit 3 as needed, such that the first display unit 2 and the second display unit 3 meet the need for practical use.

In an embodiment of the present disclosure, the first gas guide unit 4 comprises a first fan 41, a second fan 42 and a first filtering module 43. The first fan 41 lies above the second fan 42. The first filtering module 43 at least corresponds in position to the second fan 43. The second gas guide unit 5 comprises a third fan 51, a fourth fan 52 and a second filtering module 53. The third fan 51 lies above the fourth fan 52. The second filtering module 53 at least corresponds in position to the fourth fan 52.

In the aforesaid embodiment, cool air outside the casing 6 is taken in by the second fan 42 through the first filtering module 43 and then delivered by the first fan 41 to space between the frame 1 and the casing 6 to achieve convection. Next, air which survives the convection is taken in by the third fan 51 and then discharged from the casing 6 through the second filtering module 53 by the fourth fan 52. Therefore, the gas guidance enabled by the first gas guide unit 4 and the second gas guide unit 5 facilitates heat dissipation of the first display unit 2 and the second display unit 3. However, the aforesaid embodiment serves an exemplary purpose only. In practice, the heat dissipation may be facilitated by the gas guidance carried out in different directions by the first fan 41, the second fan 42, the third fan 51 and the fourth fan 52.

In an embodiment of the present disclosure, the casing 6 further comprises a first light-penetrable board 65 and a second light-penetrable board 66. The first light-penetrable board 65 is disposed at the first window portion 61 and hermetically seals the first display unit 2. The second light-penetrable board 66 is disposed at the second window portion 62 and hermetically seals the second display unit 3. Therefore, the first light-penetrable board 65 and the second light-penetrable board 66 together render the first display unit 2 and the second display unit 3 waterproof, so as to effectively meet the usage needs in outdoor environments.

In an embodiment of the present disclosure, the link unit 7 is a GPS communication interface, 4G communication interface, 5G communication interface or Wi-Fi communication interface. Therefore, the link unit 7 can steadily receive remove advertisement playing data to avoid message interruptions.

In an embodiment of the present disclosure, the playing control unit 8 is disposed on the outer side of the casing 6. The playing control unit 8 has a connector 81 and a transmission line 82. The first display unit 2, the second display unit 3, the first gas guide unit 4, the second gas guide unit 5 and the link unit 7 are connected to the connector 81. The playing control unit 8 is connected to the connector 81 by the transmission line 82. Therefore, the first display unit 2, the second display unit 3, the first gas guide unit 4, the second gas guide unit 5, the link unit 7 and the playing control unit 8 are connected by the connector 81 and the transmission line 82 to transmit electric power and advertisement playing data.

Alternatively, the playing control unit 8 is disposed on an inner side (not shown) of the casing 6 without the connector 81 and the transmission line 82, so as to meet practical operation needs.

In an embodiment of the present disclosure, the vehicular advertisement playing device further comprises a first photosensor 21 and a second photosensor 31. The first photosensor 21 is connected to the first display unit 2. The second photosensor 31 is connected to the second display unit 3. Therefore, the first photosensor 21 and the second photosensor 31 adjust brightness of the first display unit 2 and the second display unit 3, respectively, according to ambient illumination brightness.

While the present disclosure has been described by means of specific embodiments, numerous modifications and variations could be made thereto by those skilled in the art without departing from the scope and spirit of the present disclosure set forth in the claims.

What is claimed is:

1. A vehicular advertisement playing device, comprising:
a frame mounted on a vehicle;
a first display unit disposed on a side of the frame;
a second display unit disposed on another side of the frame;
a first gas guide unit disposed at an end of the frame;
a second gas guide unit disposed at another end of the frame;
a casing with a side having a first window portion, another side having a second window portion, an end having a first through hole portion, and another end having a second through hole portion, the casing being coupled to the frame, the first window portion corresponding in position to the first display unit, the second window portion corresponding in position to the second display unit, the first through hole portion corresponding in position to the first gas guide unit, and the second through hole portion corresponding in position to the second gas guide unit;
a link unit disposed at a top of the casing; and
a playing control unit connected to the first display unit, the second display unit, the first gas guide unit, the second gas guide unit and the link unit.

2. The vehicular advertisement playing device of claim 1, wherein at least two coupling portions are disposed at a bottom of the frame and coupled to the vehicle, and the bottom of the frame has a plurality of through holes.

3. The vehicular advertisement playing device of claim 1, wherein at least two securing portions are disposed at a top of the frame and coupled to the casing.

4. The vehicular advertisement playing device of claim 1, wherein the first display unit and the second display unit are multimedia displays, screens or touchscreens.

5. The vehicular advertisement playing device of claim 1, wherein the first gas guide unit comprises a first fan, a second fan and a first filtering module, the first fan lying above the second fan, and the first filtering module at least corresponding in position to the second fan.

6. The vehicular advertisement playing device of claim 1, wherein the second gas guide unit comprises a third fan, a fourth fan and a second filtering module, the third fan lying above the fourth fan, and the second filtering module at least corresponding in position to the fourth fan.

7. The vehicular advertisement playing device of claim 1, wherein the casing further comprises a first light-penetrable board and a second light-penetrable board, the first light-penetrable board being disposed at the first window portion and hermetically sealing the first display unit, and the second light-penetrable board being disposed at the second window portion and hermetically sealing the second display unit.

8. The vehicular advertisement playing device of claim 1, wherein the link unit is a GPS communication interface, 4G communication interface, 5G communication interface or Wi-Fi communication interface.

9. The vehicular advertisement playing device of claim 1, wherein the playing control unit is disposed on an outer side of the casing and has a connector and a transmission line, wherein the first display unit, the second display unit, the first gas guide unit, the second gas guide unit and the link unit are connected to the connector, whereas the playing control unit is connected to the connector by the transmission line.

10. The vehicular advertisement playing device of claim 1, further comprising a first photosensor and a second photosensor, the first photosensor being connected to the first display unit, and the second photosensor being connected to the second display unit.

* * * * *